2,794,788

ADHESIVE COMPOSITIONS CONTAINING ALKYL ESTERS OF CYANOACRYLIC ACID

Harry W. Coover, Jr., and Newton H. Shearer, Jr., Kingsport, Tenn., assignors to Eastman Kodak Company, Rochester, N. Y., a corporation of New Jersey No Drawing. Application November 1, 1952, Serial No. 318,325

4 Claims. (Cl. 260—17)

This invention relates to adhesive compositions containing certain esters of α-cyanoacrylic acid and to methods for their use.

Heretofore, no one type of adhesive has been generally useful as offering an outstanding bond with all classes of articles. We have made the important discovery that the esters of α-cyanoacrylic acid described hereinafter and employed in accordance with the present invention are outstanding high-strength adhesives for bonding all kinds of articles such as glass, metals, plastics, rubber, wood, cement, paper, cloth, etc. to themselves or to each other.

An object of the invention is an improved process for causing articles to adhere together.

Another object of the invention is an improved adhesive composition which is generally applicable for sticking like and unlike articles together.

In accordance with the invention these and other objects are attained by employing as the base for the adhesive a monomeric alkyl ester of α-cyanoacrylic acid having the general formula:

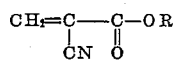

wherein R is an alkyl group of 1 to 16 carbon atoms, a cyclohexyl group or a phenyl group. Such alkyl esters in which the alkyl group is a methyl, ethyl, n-propyl, isopropyl, isobutyl or amyl group are particularly effective as adhesives. The selected monomeric ester after being applied to one or both of the surfaces to be joined is permitted to polymerize to produce a high strength adhesive bond. A polymerization catalyst is not required and the polymerization can take place at approximately room temperatures and atmospheric pressures. Moderate heating to promote polymerization after the monomer is in position to become adhesive is desirable in some instances.

If it is desired to dispense this novel adhesive in containers, we prefer to employ air tight containers and to stabilize the monomer against auto polymerization by employing small amounts of stabilizing materials such as sulfur dioxide, boron trifluoride and hydrogen fluoride. Polymerization of the monomer may also be inhibited by storing the unstabilized monomer at 0° C. until use. On warming to room temperature, i. e. 20° C., polymerization will take place.

The stabilized or unstabilized monomeric ester may be applied in a thin layer to one surface of the material to be bonded and the other piece of material to be bonded is then placed firmly against the coated surface. Upon contact of the two surfaces, an almost instantaneous high strength bond is formed. The ease of fabrication and speed with which high-strength bonds are formed without the use of raised pressure and solvent removal incurred in the use of previously known adhesives, are of tremendous industrial importance.

The mechanism by which these cyano acrylates function as adhesives is not completely understood; however, it is thought that adhesive properties are attributable to the rapidity with which thin films of the monomeric α-cyano acrylates polymerize in the absence of heat, light or polymerization catalyst. Hence, when two surfaces are placed together with a thin film of a monomeric cyano acrylate between them, the monomer rapidly polymerizes to produce a high-strength bond. The bond strength of these cyano acrylates is also dependent upon the thickness of the bond as in the case with other adhesives. Highly tenacious bonds are produced with very thin applications of the selected ester compound. In this regard, the low viscosity of these monomeric cyano acrylates is important in bonding non-porous materials. These monomeric cyano acrylates give excellent surface penetration and readily spread out to very thin liquid films. In bonding more porous materials where the low viscosity of the monomer results in too great a penetration, the viscosity can be increased to an optimum amount by dissolving minor proportions of polymeric alkyl cyano acrylates in the monomer. Also other compounds such as the poly acrylates, poly methacrylates, cellulose nitrate, cellulose acetate, cellulose propionate, cellulose butyrate and other such cellulose esters, which are soluble in monomeric alkyl α-cyano acrylates can be employed in this manner as viscosity regulators. Up to 25% by weight of these materials may be employed effectively to regulate the viscosity of the selected monomers.

Surface cleanliness and preparation are of utmost importance to the realization of high-strength bond with prior art adhesives. In the use of these cyano acrylate adhesives, of this invention, these factors are not critical; however, it is advantageous to have the surface quite free from oil and dirt for maximum bond strength.

The stated esters of α-cyanoacrylic acid have outstanding advantages over the adhesives now generally employed. For example, no volatiles are present in this bonding agent and, consequently, the long curing time necessary for the escape of the volatiles from ordinary bonding agents is unnecessary. Also, the fact that heat and excessive pressures are not generally required is of great advantage in fabricating larger assemblies involving points which are difficult to reach.

The optical clarity of the bonds, rapidity and ease of fabrication, water resistance, etc. suggest a multitude of valuable uses for these cyano acrylates as adhesives. This invention contemplates many applications for these α-cyanoacrylic esters as adhesives for example, in the cementing of lenses and the rapid fabrication of waterproof plywood, as well as uses in dental fillings, mechanical and structural assemblies, brake linings, wing and fuselage skins of high speed aircraft, sealing strips, decorative trim, metal foils to non-metallics for electrical conductivity, etc.

The monomeric α-cyanoacrylic acid esters, which are employed in the present invention may be prepared by reacting esters of cyano acetic acid with formaldehyde in aqueous solution in the presence of a basic condensation catalyst in accordance with the method described in U. S. Patent 2,467,927 of April 19, 1949. These α-cyanoacrylic acid esters may also be obtained as described in U. S. Patent 2,467,926 of April 19, 1949 by reacting an alkyl, cyclohexyl or phenyl cyano-acetate first with an alkali metal alcoholate and then with a compound of the general structure $ROCH_2X$ in which R may be the desired group of the general formula on page 1 and X is a halogen atom. In these methods phosphorous pentoxide and nitric oxide is employed in stabilizing the monomer during isolation and storage.

We have found by employing other stabilizing materials in these methods for preparing the monomers, that monomers which will polymerize smoothly under normal conditions such as at room temperature i. e. approximately 20° C. can be obtained. The crude monomers can be stabilized during redistillation at one to five mm. pressure by the continuous admission of small amounts of sulfur dioxide. This distillate of alkyl α-cyano acrylate acid containing sulfur dioxide can be employed as a cement or adhesive without further treatment and without resorting to elevated temperatures. It is preferred to limit the concentration of sulfur dioxide present in the monomers to that small amount which remains dissolved in the distillate after the distilaltion is completed. The presence of larger quantities is not as desirable in that a longer time is required for the formation of a firm bond. In such a case the application of heat does shorten the bonding time.

We have also found not only is sulfur dioxide a superior stabilizer for these α-cyano acrylic acid ester monomers but that boron trifluoride and hydrogen fluoride are also very effective while carbon dioxide is less effective. When larger than the desired amounts of sulfur dioxide or boron trifluoride are present, a more rapid bonding action can be brought about by neutralization of the stabilizers with a base such as ammonia, pyridine, quinoline, piperidine, morpholine, etc. Care must be taken not to add an excess of alkali and, consequently, bring about such a rapid polymerization of the monomeric cement that adhesiveness of the cement is weakened.

We have found that the presence of 0.001% by weight (or volume) of sulfur dioxide in a monomer of these esters of α-cyano acrylic acid made in accordance with the invention is sufficient to inhibit polymerization during several days' storage at room temperature, i. e. approximately 20° C., when 0.06% of sulfur dioxide is present in the monomer, the adhesive is also stable under room temperature storage. However, this later composition is definitely sluggish in bond formation. The sulfur dioxide content can be reduced easily just before the composition is to be employed or after it has been applied to the surface to be adhered by subjecting the monomer to low pressure in a vacuum pumping apparatus, such as 0.5 to 1.0 mm. at room temperatures for 5 to 10 minutes. For purpose of storage over long periods of time, it is convenient to load the monomer with larger quantities of sulfur dioxide for example from 0.1 to 2.0%. Thus excess sulfur dioxide can be reduced to the optimum limit by the low pressure treatment mentioned above to provide the adhesive in a very active form.

The following examples further illustrate the present invention:

*Example 1.—Glass to glass bond with stabilized ethyl α-cyanoacrylate*

A piece of ordinary plate glass three inches long and one inch wide was moistened with one drop of ethyl α-cyanoacrylate which contained only that small amount of sulfur dioxide which remained dissolved in it after it had been distilled at 3 mm. pressure in a sulfur dioxide atmosphere, i. e. 0.001% by weight. Another similar piece of glass was placed crosswise on top of the wetted glass and pressed so that the monomeric acrylate was spread into a very thin film. Within a few seconds a strong bond formed. The two pieces of glass could not be pried loose by hand, nor by any ordinary blows. When the glass was broken by application of a very strong force, the cemented portions although they were cracked, remained attached in "safety glass" fashion.

*Example 2.—Glass to glass bond with unstabilized isobutyl α-cyanoacrylate*

The procedure of Example 1 was followed using isobutyl α-cyanoacrylate which contained no stabilizer. A strong glass to glass bond was likewise formed.

*Example 3.—Glass to glass bond with ethyl α-cyanoacrylate containing excess stabilizer*

The procedure of Example 1 was followed using ethyl α-cyanoacrylate to which a very small amount of boron trifluoride ether solution had been added. This composition was slow to form the bond when handled as described in the Example 1. However, when the unmoistened plate was exposed to ammonia vapor before being pressed onto the plate holding the monomer and bonding occurred quite rapidly.

*Example 4.—Metal to metal bond with unstabilized ethyl α-cyanoacrylate*

The procedure of Example 1 was followed using pure ethyl α-cyanoacrylate containing no stabilizer to rapidly form a strong bond between two strips of aluminum.

*Example 5.—Plastic to plastic bond with stabilized methyl α-cyanoacrylate*

The procedure of Example 1 was followed to rapidly form a strong bond between two pieces of methyl methacrylate using as the adhesive the methyl α-cyanoacrylate containing a very small quantity of dissolved sulfur dioxide.

*Example 6.—Unstabilized monomer as adhesive*

Monomeric methyl α-cyanoacrylate containing no stabilizer was sealed in an air free container and held at a temperature of 0° C. for several days. No polymerization was noted when the can was opened. Some of this monomer was placed on an aluminum strip and a glass strip placed thereover. When the temperature of the monomer increased to approximately 20° C. polymerization occurred and the two strips were held together by the adhesive thus formed.

*Example 7.—Reduction of stabilizer by vacuum treatment*

Monomeric methyl α-cyanoacrylate containing 0.06% by weight of sulfur dioxide and sealed in a closed metal can was employed to stick two aluminum surfaces together in the following manner. The can was opened and placed in a vacuum chamber and the pressure lowered by a vacuum pump to 1.0 mm. at 20° C. for five minutes. This drew off substantially all of the sulfur dioxide contained in the monomer which polymerized rapidly when placed on a thin layer between the aluminum pieces to form a tenacious bond.

*Example 8*

Monomeric ethyl α-cyanoacrylate containing 0.5% boron trifluoride by weight was treated with dilute ammonium hydroxide to neutralize the boron trifluoride. A thin layer of the treated monomer was placed between two glass elements of an optical device and polymerization rapidly took place after which the glass elements could not be separated.

*Example 9.—Rubber to glass bond with unstabilized palmityl α-cyanoacrylate*

The procedure of Example 1 was followed to bond a strip of foam rubber to glass with the use of monomeric palmityl α-cyanoacrylate containing no stabilizer. A strong bond formed within 3 minutes. The longer chain alkyl esters formed bonds somewhat more slowly than the corresponding methyl and ethyl esters.

*Example 10.—Wood and wood bond with stabilized cyclohexyl α-cyanoacrylate*

Monomeric cyclohexyl α-cyanoacrylate containing 0.001% sulfur dioxide was applied to small surface areas of two strips of oak wood. The strips were allowed to stand exposed to the air for 2 minutes. A small amount of the monomer was then used in a second application. Again the wood strips were allowed to stand exposed to the air for 2 minutes. The moistened surface areas were then pressed together and held for 3 minutes. A strong bond formed which could not be broken without splitting out pieces of the wood itself.

*Example 11.—Glass to glass bond with unstabilized lauryl α-cyanoacrylate*

The procedure of Example 1 was followed using monomeric lauryl α-cyanoacrylate containing no stabilizer to bond two pieces of glass plate. A strong bond formed within 3 minutes.

*Example 12.—Glass to glass bond with stabilized capryl α-cyanoacrylate*

The procedure of Example 1 was followed using monomeric capryl α-cyanoacrylate containing 0.001% sulfur dioxide to bond two pieces of glass plate in a strong bond formed within 2 minutes.

*Example 13.—Patching with stabilized methyl α-cyanoacrylate*

A piece of material used in tent construction was employed in this application. A piece of nylon cloth coated with polyvinylchloride was moistened at the edges with monomeric methyl α-cyanoacrylate containing 0.001% sulfur dioxide as a stabilizer. This patch was applied to a larger piece of the same material. A completely sealed bond formed immediately and furnished a convenient means of patching the tent.

*Example 14.—Glass to glass bond with stabilized phenyl α-cyanoacrylate*

The procedure of Example 1 was followed using monomeric phenyl α-cyanoacrylate containing 0.001% sulfur dioxide to bond two pieces of glass plate. A strong bond formed within 2 minutes.

*Example 15.—Glass to glass bond with methyl α-cyanoacrylate containing polymer*

A more viscous adhesive composition was obtained by dissolving 10% by weight of polymeric methyl α-cyanoacrylate in monomeric methyl α-cyanoacrylate stabilized with 0.001% sulfur dioxide. The resulting fluid had approximately the viscosity of a light syrup. Following the procedure of Example 1, this more viscous formulation was used to bond two pieces of plate glass. A strong bond was formed within 3 minutes. The viscous formulation, although still quite rapid in action, forms bonds somewhat more slowly than the monomeric methyl α-cyanoacrylate. The above procedure was also carried out with an even more viscous formulation which contained 25% by weight of polymeric methylmethacrylate.

*Example 16.—Bonding polyethyleneterephthalate film with monomeric methyl α-cyanoacrylate*

Two strips of polyethyleneterephthalate film of 1 mil thickness and 0.71 in. width were bonded in the following manner to make one continuous strip of film. Monomeric methyl α-cyanoacrylate containing 0.001% sulfur dioxide was applied in a narrow band along the edge of one piece of the film. The two pieces of film were aligned and pressed together to bond a surface area of 0.09 sq. in. After one-half minute, a strong bond formed which withstood all ordinary stresses to shear by hand. The measured tensile strength of this bond was 130 lb./sq. in. Some cold drawing of the film occurred during this measurement.

*Example 17.—Bonding polysulfone ester film with monomeric ethyl α-cyanoacrylate*

Following the procedure of Example 16, two pieces of flexible polysulfone ester film were bonded together with monomeric ethyl α-cyanoacrylate to form a bond 0.1 sq. in. in area. This polymeric film was obtained by the condensation polymerization of pentamethyleneglycol with p,p'-bis[carbomethoxyphenyl]-sulfone. A strong bond formed within one-half minute and resisted all ordinary attempts to shear it by hand. In the attempt to measure tensile strengths of this bond, the polyester film itself underwent cold drawing but the bond remained unbroken.

*Example 18.—Bonding cellulose triacetate film*

Following the procedure of Example 16, two pieces of flexible cellulose triacetate film of the type used for movies were bonded. A strong bond formed rapidly. It was quite resistant to shear.

*Example 19.—Bonding nylon film*

Following the procedure of Example 16, two pieces of flexible nylon film were bonded using monomeric isobutyl α-cyanoacrylate. A strong bond quite resistant to shear formed rapidly.

*Example 20.—Bonding cellulose ester film*

Following the procedure of Example 16, two pieces of flexible cellulose ester film comprising cellulose acetate and cellulose acetate butyrate were bonded using monomeric capryl α-cyanoacrylate as the adhesive. A strong bond formed within two minutes. This bond was somewhat more flexible than that obtained with the lower alkyl esters.

*Example 21.—Bonding of cellulose triacetate film using combined monomeric and polymeric methyl α-cyanoacrylate*

The procedure of Example 16 was followed to bond two pieces of cellulose triacetate film with the use of an adhesive formulation consisting of monomeric methyl α-cyanoacrylate which contained 15% by weight of polymeric methyl α-cyanoacrylate. A strong bond formed within two minutes.

*Example 22.—Bonding perlon film*

The procedure of Example 16 was followed in bonding two pieces of perlon [poly-ε-aminocaprolactam] with the use of monomeric methyl α-cyanoacrylate. A strong bond formed within one minute.

*Example 23*

The procedure of Example 9 was followed to bond a strip of vulcanized rubber to a metal surface with the use of monomeric palmityl α-cyanoacrylate containing .001% sulfur dioxide. Polymerization of the monomer took place within 5 minutes. A tenacious rubber to metal bond resulted.

We claim:

1. A new adhesive composition which is stable in bulk but autopolymerizable when spread in a thin film, said composition comprising a monomeric ester of α-cyano acrylic acid having the general formula:

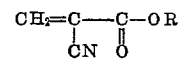

wherein R is a member selected from the class consisting of an alkyl group of 1 to 16 carbon atoms, a cyclohexyl group and a phenyl group, and containing as a stabilizer against polymerization in bulk, sulfur dioxide present in a concentration of 0.001% to 0.06% by weight.

2. A new adhesive composition comprising the methyl ester of α-cyano acrylic acid and containing as a stabilizer against polymerization from 0.001 to 0.06% by weight of sulfur dioxide.

3. A new adhesive composition comprising the ethyl ester of α-cyano acrylic acid and containing as a stabilizer against polymerization from 0.001 to 0.06% by weight of sulfur dioxide.

4. A new adhesive composition comprising a monomeric ester of α-cyano acrylic acid having the general formula:

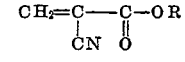

wherein R is a member selected from the class consisting of an alkyl group of 1 to 16 carbon atoms, a cyclohexyl group, and a phenyl group, and containing as a stabilizer against polymerization from 0.001 to 0.06% by weight of sulfur dioxide, and also containing as a viscosity regulator not more than 25% by weight of a polymeric material soluble in said monomeric ester and being selected from the group consisting of a polymethacrylate, a polyacrylate, a polyalkylcyanoacrylate, cellulose nitrate, and cellulose organic acid esters.

References Cited in the file of this patent

UNITED STATES PATENTS

| | | |
|---|---|---|
| 1,943,972 | Izard | Jan. 16, 1934 |
| 2,113,764 | Macht | Apr. 12, 1938 |
| 2,346,858 | Mighton | Apr. 18, 1944 |
| 2,351,157 | Semon | June 13, 1944 |
| 2,467,927 | Ardis | Apr. 19, 1949 |
| 2,535,827 | Ardis et al. | Dec. 26, 1950 |
| 2,535,861 | Miller | Dec. 26, 1950 |
| 2,672,477 | Heinemann | Mar. 16, 1954 |

FOREIGN PATENTS

| | | |
|---|---|---|
| 715,961 | France | Oct. 5, 1931 |
| 596,679 | Germany | May 11, 1934 |

OTHER REFERENCES

Journal of the American Chemical Society, 1946, vol. 68, page 908.